United States Patent [19]
Oosterkamp

[11] Patent Number: 5,345,481
[45] Date of Patent: Sep. 6, 1994

[54] NUCLEAR REACTOR PLANT WITH CONTAINMENT DEPRESSURIZATION

[75] Inventor: William J. Oosterkamp, Oosterbeek, Netherlands

[73] Assignee: General Elecric Company, San Jose, Calif.

[21] Appl. No.: 963,227

[22] Filed: Oct. 19, 1992

[51] Int. Cl.⁵ ............................................. G21C 9/00
[52] U.S. Cl. ................................. 376/293; 376/299; 376/283
[58] Field of Search ................... 376/293, 299, 283

[56] References Cited

U.S. PATENT DOCUMENTS 3,899,391  8/1975  Sulzer et al. ..................... 376/293

OTHER PUBLICATIONS

"Forced Convection Condensation in the Presence of Noncondensables and Interfacial Resistance," E. M. Sparrow, W. J. Minkowycz, and M. Saddy, *Int. J. Heat Mass Transfer*, vol. 10, pp. 1829–1845, Pergamon Press 1967.

"Heat Removal Tests if Isolation Condenser Applied as a Passive Containment Cooling System," H. Nagasaka, K. Yamada, M. Katoh, and S. Yokoburi.

"BWR Passive Containmetn Cooling System by Condensation–Driven Natural Circulaiton," K. N. Vierow, H. E. Townsend, J. R. Fitch, J. G. Munthe Andersen, M. Almagir, and V. E. Schrock.

*Primary Examiner*—Donald P. Walsh
*Assistant Examiner*—Frederick A. Voss
*Attorney, Agent, or Firm*—J. S. Beulick

[57] ABSTRACT

A boiling-water reactor plant employs a baffle that parallels the interior surface of a thermally-conductive containment wall, defining an intermediate condensate channel. When the plant turbine becomes isolated from the boiling-water reactor, the reactor is shut down and steam is released from the reactor pressure vessel to the containment. Steam rises through an opening at the top of the baffle, allowing some of the steam to condense on the interior surface of the containment. Condensate then flows into the channel, which is dimensioned so that noncondensable gases are dragged into the channel along with the condensate. This minimizes thermal insulation due to the noncondensables and enhances the transfer of heat from the containment. Furthermore, the noncondensable gases are dragged at a sufficient velocity to induce turbulence. The resulting mixing of condensate flow layers further improves heat transfer to the containment wall.

15 Claims, 4 Drawing Sheets

NUCLEAR REACTOR PLANT WITH CONTAINMENT DEPRESSURIZATION

BACKGROUND OF THE INVENTION

The present invention relates to nuclear reactor plants and, more particularly, to a plant depressurization system. A major objective of the present invention is to provide for simple and reliable handling of steam generated during a plant shutdown.

In a nuclear reactor, heat is generated by fissioning within a reactor core. In a boiling-water reactor (BWR), this heat is used to boil water circulating within a reactor pressure vessel enclosing the core. The steam so generated can be used to drive a turbine, which in turn can drive a generator to produce electricity.

Under certain exigencies, the turbine can become decoupled from the reactor. In response to this decoupling, control rods are automatically fully inserted to minimize further fissioning and, thus, heat generation. Heat already generated in the core continues to boil water, which no longer is condensed by the transfer of energy to the turbine. Pressure due to the accumulating steam is relieved by releasing steam from the reactor pressure vessel via a piped connection to the wetwell in the containment where the released steam is condensed.

After the control rods are fully inserted, fissioning falls to about 1% of reactor power within three hours and to about 0.5% within one day. To prevent core overheating, coolant released to the containment is replenished by water delivered from a gravity-driven cooling system (GDCS).

It is economically undesirable to build a wetwell structure large enough to handle all the steam that can be generated by decay heat over a period of days. Instead, a reactor plant is designed so that, so far as is possible, the heat is removed from the containment, relieving the pressure buildup. In existing reactor plant designs, this is done by cooling the wetwell using heat exchangers and pumps. In newer passive designs the use of pumps is not desired and excessive pressure buildup and consequent failure of the containment must be prevented even in the absence of electrical power to drive the pumps.

One option is to condense the steam on steel containment walls. This process can be facilitated by spilling water on the exterior of the containment walls. However, in addition to condensable steam, the wetwell contains noncondensable gases, such as nitrogen, that fill the drywell before the isolation event. The noncondensable gases can accumulate near containment walls, inhibiting heat transfer from steam to the walls, thus limiting condensation. Moreover, the surface area required for adequate pressure relief results in a huge containment structure. A huge containment structure is more costly and is more subject to defects than a more compact structure. Thus, an approach to pressure relief is required that permits a more compact structure.

A more economical approach is to duct released steam from the reactor vessel to an isolation condenser. A typical isolation condenser is a heat exchanger including a multitude of small-diameter tubes submerged in a pool of water. As steam flows through these tubes, heat is transferred from the steam through the tube walls to the condenser pool. Once the condenser pool boils, the steam so generated can be vented to the environment since it contains no radioactive material. Isolation condensers are also subject to the insulating effects of noncondensable gases, but proper design can lead to the evacuation of the noncondensable gases from the tubes, facilitating heat transfer and steam condensation.

A concern with the use of isolation condensers is that the relatively thin condenser tube walls become, in effect, a weak link in the primary system boundary, as the condenser is normally connected to the reactor vessel and is at full reactor pressure. Failure of the thin condenser walls will lead not only to a slow depressurization of the reactor vessel but also forms a direct pathway for radioactive products in the vessel to the environment, thereby bypassing the containment.

In addition, an isolation condenser presents a complex structure that must be periodically maintained. Preferably, the isolation condensers are made compact to permit their removal for repair. This poses serious problems on the flow stability of the exterior side of the condenser. The isolation condenser will thus be designed to have a minimum surface area, in order to reduce the probability for leakage. This is achieved in limiting the design to handle the heat load only at full pressure (7 MPa) of the vessel and with no noncondensables present. The conditions are quite different after the failure of systems or lines connected to the reactor vessel or of the reactor vessel itself. Steam and/or hot water will then be released into the drywell in the containment that surrounds the reactor vessel and the attached systems. The volume of the wetwell is however not sufficient to handle all the steam that can be generated by decay heat over a period of days. Accordingly, an effective and economical steam pressure relief system is required which addresses the insulating effects of noncondensable gases, maintains a secure containment boundary, and permits convenient inspection and repair.

SUMMARY OF THE INVENTION

In accordance with the present invention, a baffle structure lines part of the interior surface of a thermally conductive containment wall of a boiling-water nuclear reactor plant. The containment isolates a boiling-water reactor from the containment exterior, i.e., the environment. The reactor itself includes a fissionable core enclosed within a reactor pressure vessel. The baffle structure defines at least one condenser channel along the interior surface of the containment wall through which condensate can flow, generally downward, after forming on the containment wall. The baffle structure includes an aperture or other access means allowing steam to rise to an upper volume above the baffle structure to reach a portion of the interior surface.

The containment wall preferably has cylindrical symmetry, being preferably cylindrical or dome-shaped. It should be formed of steel or material that is at least half as thermally conductive as steel. The entire containment need not be thermally conductive; for example, the base and lower sidewalls can be of concrete. However, the portion of the containment near the baffle structure should be thermally conductive to promote heat transfer to a body of water in contact with the exterior of the wall.

The condenser channel can be characterized by its hydraulic diameter. The hydraulic diameter $D_h$ can be calculated by the equation $D_h = 4P_w/A$, where $P_w$ is the wetted perimeter of the channel and $A$ is the cross-sectional area of the channel. (Note the hydraulic diameter of a cylindrical tube is its internal diameter). The baffle structure generally conforms to the adjacent containment wall to maintain substantially constant channel dimensions, and thus a constant hydraulic diameter.

The hydraulic diameter is selected so that condensate falling through the channel drags other gaseous matter down with it. This means that the hydraulic diameter cannot be so small that condensate fills the channel; on the other hand, it cannot be so large that the friction from the flowing condensate has negligible effect on the bulk of the gaseous matter in the channel nor so large that gases can circulate within the channel. Preferably, the hydraulic diameter is selected so the velocity of the dragged gaseous material is sufficient to induce turbulent flow of the gaseous matter. To this end, the hydraulic diameter of the condenser channel should be at most 300 millimeters (mm), and preferably between 10 mm and 50 mm.

Fins can be attached to the containment to increase the area of heat transfer and support the baffle structure. The fins can slope downward toward the baffle to help direct condensate away from the containment wall and toward the baffle. By removing condensate from the containment wall, fins provide better steam access to the containment wall, thus facilitating heat transfer.

In the event of a turbine isolation or other event causing a considerable amount of steam to be released from the reactor, the steam rises through the baffle access to the thermally conductive containment wall. Heat is transferred from the steam through the wall to the external body of water. Due to the loss of heat, steam condenses to water. Gravity pulls the condensate downward to flow along the containment wall and into the channel.

Friction associated with the condensate drags some gaseous matter into and through the channel. This gaseous matter includes not only uncondensed steam, but also noncondensables, such as nitrogen, that occupied most of the containment before steam was released. The noncondensables are heavier than steam and will flow with the condensate downward, being continually replaced by rising steam from the reactor or wetwell. Since noncondensables are continually evacuated from the upper volume adjacent the containment wall, rising steam has continual access to the condensing action of the containment wall.

The advantages of removing noncondensables from the thermally conductive wall pertain whether they are subject to laminar flow or to turbulent flow. If the condensate flows relatively slowly and/or if the hydraulic diameter of the channel is relatively large, the flow is laminar. In laminar flow, the gaseous matter flows at different rates depending on distance from the condensate so that flow is effectively stratified. At higher condensate velocities and/or smaller hydraulic diameters, laminar flow is interrupted and flow becomes turbulent. Former stratifications mix, enhancing heat transfer.

The desired dragging and turbulence can be achieved at gas velocities of 3-10 meters/second. Such velocities are readily achieved by natural circulation using the baffles to direct the flow. The interfacial forces between the falling condensate film and the gaseous matter accelerate the latter to these velocities, improving heat transfer.

Thus, the present invention improves heat transfer from a reactor containment by removing noncondensables from heat exchanging walls. Further advantages are attained by inducing waves in flowing condensate. Improved heat transfer increases condensation and relieves pressure. This means a given containment wall area can handle containment pressurization more effectively. This permits smaller containments to handle a given worst-case scenario, resulting in increased safety and economy in boiling-water reactor plants. In addition, the baffles can be a straightforward design and can be simply removed for inspection and repair of the baffle exterior and the interior wall of the containment. These and other features and advantages of the present invention are apparent from the description below with reference to the following drawings.

DESCRIPTION OF THE PREFERRED EMBODIMENTS

Figure 1:
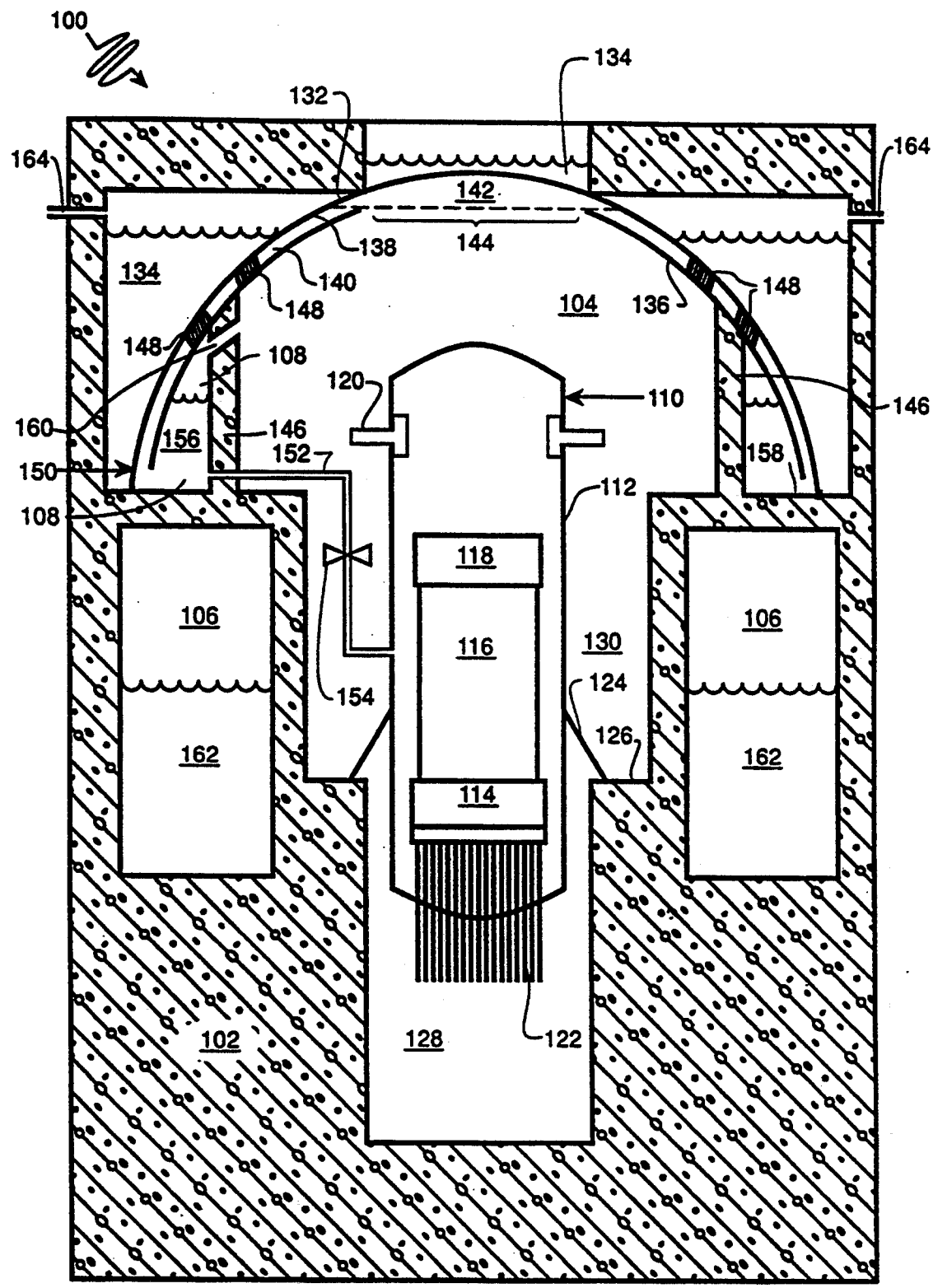
FIG. 1 is a schematic sectional view of a reactor plant in accordance with the present invention.

A reactor plant 100 embodying the present invention includes a concrete reactor building 102, shown in FIG. 1. Building 102 includes several compartments, including a drywell 104, a wetwell 106, and a GDCS chamber 108. A reactor 110, disposed within drywell 104, comprises a reactor pressure vessel 112 and its internals including a fissionable core 114, a chimney 116 to promote water circulation, and a dryer 118 to seperate water from steam before it exits vessel 112 through main steam nozzles 120 to drive a turbine (not shown). Control rod assemblies 122 penetrate the bottom of vessel 112 and permit control rods to be inserted into and retracted from core 114 to regulate power output. Vessel 112 is supported by a skirt 124 on a ledge 126 of drywell 104. Skirt 124 divides drywell 104 into a lower drywell 128 and an upper drywell 130.

Containment for reactor 110 is provided in part by various substructures of concrete building 102. However, the containment also includes a steel containment dome 132 above reactor 110. Dome 132 is submerged in external condenser pools 134 of water. The diameter of dome 132 is 20 meters, while the diameter of reactor vessel 112 is 7 meters. In accordance with the present invention, reactor plant 100 includes a baffle 136 within drywell 104 that parallels an interior surface 138 of dome 132. To provide the parallelism, baffle 136 is basically dome shaped. However, to provide access to an interior wall 138 of containment dome 132, baffle 136 is configured as an open-topped dome, whereas containment dome 132 is a closed-top dome. Baffle 136 extends down to within about 500 mm of a floor 158 of GDCS chamber 108.

Figure 2:
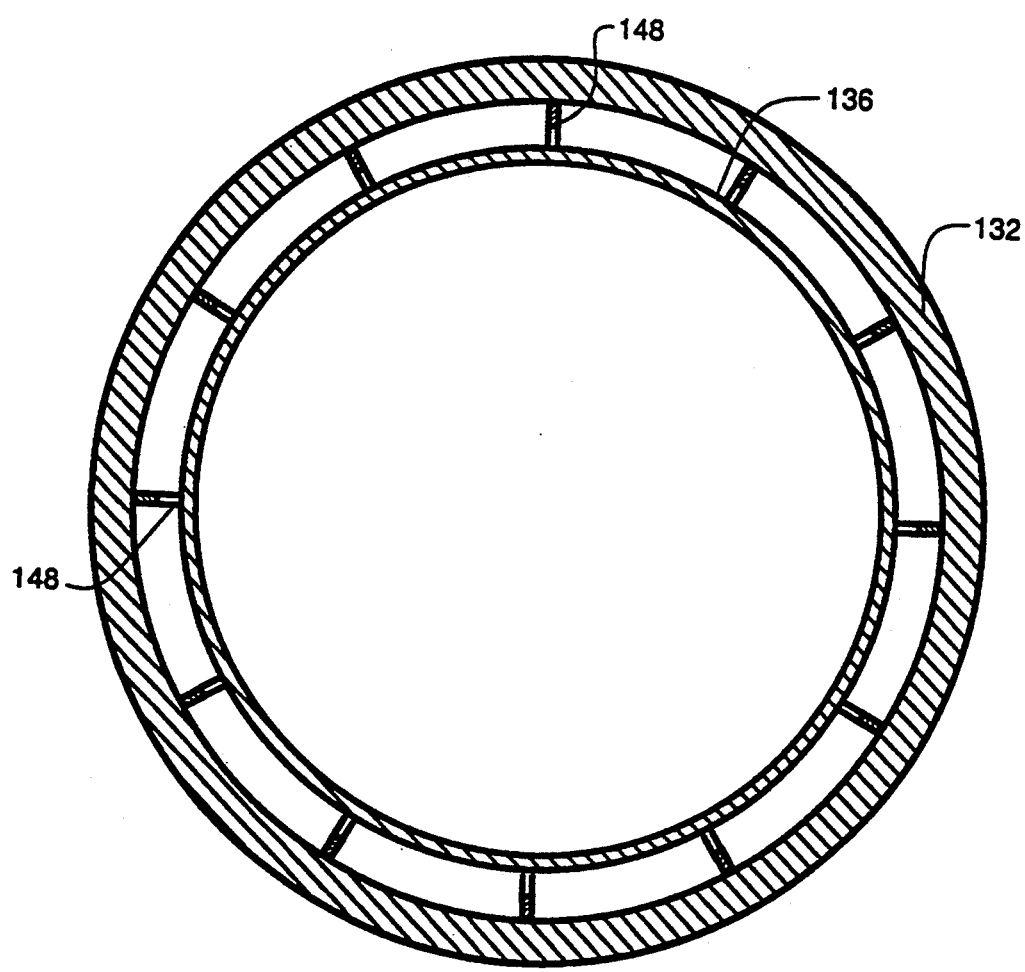
FIG. 2 is a plan section view of a portion of the reactor plant of FIG. 1.

Baffle 136 and dome 132 cooperatively define a condenser channel 140 therebetween and an upper volume 142 above baffle 136 and in the interior of dome 132. Open-topped baffle 136 defines an access aperture 144 so that steam rising from reactor vessel 112 can reach upper volume 142. Channel 140 is open at its top to permit condensate, condensable gas (steam) and noncondensable gas (e.g., nitrogen) to enter channel 140. Channel 140 is open at the bottom to allow condensate to fall into GDCS chamber 108. Baffle 136 is supported from below by a concrete annular support 146. Further support and proper spacing from containment dome is provided by fins 148, FIGS. 1 and 2. Fins 148 slope downward toward baffle 136 so as to urge condensate away from the interior surface 138.

A gravity-driven cooling system 150 includes GDCS chamber 108, a GDCS conduit 152, and a GDCS valve 154. GDCS chamber 108 holds a GDCS pool 156 of water in an amount sufficient to replenish vessel coolant, which is continually lost to the wetwell in the form of steam, for 72 hours. GDCS conduit 152 extends from GDCS chamber 108 to vessel 112 to permit gravity-driven flow of water from chamber 108 to vessel 112. Normally-closed GDCS valve 154 prevents this flow during reactor operation. GDCS chamber is bounded on the inside by annular support 146, on the outside by containment dome 132, from above primarily by baffle 136, and from below by a GDCS floor 158 that also serves as the ceiling of wetwell 106. Vents 160 through annular support 146 permit direct gaseous communication between upper drywell 130 and GDCS chamber 108 to equalize their pressures.

When systems or lines connected to the reactor vessel fail or when the reactor vessel itself fails, control rods are inserted into the core. Previously generated heat in core 114 boils coolant in the reactor, rapidly pressurizing vessel 112. Steam is automatically released to upper drywell 130, where it mixes with the noncondensable nitrogen normally stored in drywell 104. The resulting sudden depressurization of vessel 112 triggers open GDCS valve 154, permitting water of GDCS pool 156 to flow from GDCS chamber 108, through GDCS conduit 152 and into vessel 112.

When upper drywell 130 achieves a certain pressure threshold, the gaseous mixture in upper drywell 130 is automatically released to wetwell 106. Wetwell 106 holds a suppression pool 162 of water that condenses the incoming steam. However, incoming nitrogen pressurizes wetwell 106. As the internal pressure in wetwell 106 increases, gaseous communication with drywell 104 is automatically cut off, trapping the nitrogen so that the bulk, but not all, of the noncondensables are removed from upper drywell 130. This process is completed within the first 15 minutes after isolation. The present invention is directed to handling the continuing decay heat.

After the wetwell is sealed, most of the steam escaping vessel 112 rises upward through upper drywell 130, through access aperture 144, into upper volume 142 above baffle 136, and toward the center portion of interior dome wall 138. Heat from this steam is transferred through dome 132 to external condenser pools 134. When water in external condenser pools 134 begins to evaporate, the steam so generated escapes to the environment via vents 164. Interior steam and noncondensables will follow, due to pressure differences set up by the condensation and cooling in the channel 140, a radially outward and downward path along dome 132 into channel 140. Fins 148 provide a path for condensate in channel 140 to flow from interior surface 138 to baffle 136. This depletes the water film on interior surface 138 and improves heat transfer through dome 132.

Gravity draws the condensate through channel 140 to GDCS chamber 108, where the condensate partially replenishes water delivered therefrom to vessel 112. Condensate is then routed to vessel 112 by GDCS conduit 152. As indicated below, noncondensable nitrogen is dragged from upper volume 142 through channel 140 and into GDCS chamber 108.

A pressure differential is set up in condensing channel 140, with respect to the path given by GDCS pool 156, GDCS pool vent 160, and upper drywell 130. This pressure differential is caused by the increasing density of the fluid in condensing channel 140, due to the fact that nitrogen is about 30% heavier than steam at the same temperature and pressure. The partial pressure of nitrogen increases, going down in condensing channel 140, as steam is condensed. This density increase is enhanced by the cooling action of condensing channel 140. The falling condensate film will furthermore increase the pressure differential by dragging the steam and noncondensables downward. Nitrogen will accumulate in GDCS chamber 108.

The volume of the GDCS chamber 108 is sufficient to accumulate all nitrogen left over, as the majority of the nitrogen will be trapped in wetwell 106. The accumulation of noncondensables in GDCS chamber 156 will reduce the pressure differential that causes the flow into condensing channel 140. The flow and consequently the heat transfer will gradually reduce as the noncondensables accumulate in GDCS chamber 156. The inlet of GDCS line 152 can be designed so that noncondensables will be entrained into reactor vessel 112 should the condensate flow fall below a certain value. They will then no longer accumulate in GDCS chamber 156 but will circulate with the water and steam.

Alternatively a line can be constructed with a valve parallel to line 152, that ends in the lower part of the upper drywell approximately where line 152 is connected to vessel 112. The opening of the valve will then duct the noncondensables into the lower part of the upper drywell where these noncondensable gases will only slowly mix with the steam escaping from the reactor vessel. Another option is to duct GDCS chamber vent 160 to the lower part of the upper drywell, and siphon the noncondensables down.

The dimensions of channel 140 are chosen to promote the dragging of noncondensables from the region above baffle 136 through channel 140 and into GDCS chamber 108. Channel 140 is 25 mm wide, with a 10% tolerance, i.e., the distance between baffle 136 and interior surface 138 is 25+3 mm. This results in a hydraulic diameter of about 50 mm. This value is selected to optimize turbulent flow within channel 140.

More generally, channel width should be between 5 and 150 mm, and preferably between 10 and 25 mm. Restated, the hydraulic diameter should be between 10 and 300 mm, and preferably between 25 and 50 mm. The hydraulic diameter must be great enough so that the channel is not filled with condensate, excluding noncondensables from channel 140. Excessive hydraulic diameters permit gases to circulate within the channel, diminishing the ability to draw in additional noncondensables.

Between the extremes, the hydraulic diameter should be selected to establish, and preferably optimize, turbulent flow. In laminar flow, heat transfer is limited by the rate of diffusion of heat through the condensate film on interior surface 138. Turbulent flow induces mixing in the condensate, promoting more rapid heat transfer through the condensate film.

Turbulent flow correlates positively with gas velocity and negatively with hydraulic diameter. Gas velocity, in turn, is affected by the hydraulic diameter. Too small a hydraulic diameter imposes resistance on the gas flow, while an excessively large hydraulic diameter permits gas circulation and is subject to weaker drag away from the flowing condensate film. Given the dimensions of channel 140, interfacial forces between the falling condensate and the adjacent gases establish a gas velocity of about 3 to 10 meters/second. This is sufficient to establish the desired turbulence and the resulting enhancements of heat transfer through dome 132.

Due to the interrelatedness of the pertinent parameters, some empirical determination is desired for optimization. However, the performance of various hydraulic diameters and channel dimensions can be predicted by relating the fluid dynamics of comparable tubes in existing isolation condensers. Channels with similar hydraulic diameters perform similarly. For channel 140, the hydraulic diameter is about twice the channel width. Hence, the 25 mm wide channel has flow characteristics similar to that of a 50 mm diameter heat exchanger tube.

Thus, the combination of baffle 136 and dome 132 provides the functionality of a more conventional heat exchanger. One advantage of the baffle is that the containment boundary has the thickness of the dome rather than the thickness of a condenser tube. Another advantage is that the baffle and dome arrangement is simpler than a heat exchanger with its many tubes. This increases reliability and facilitates inspection.

Figure 3:
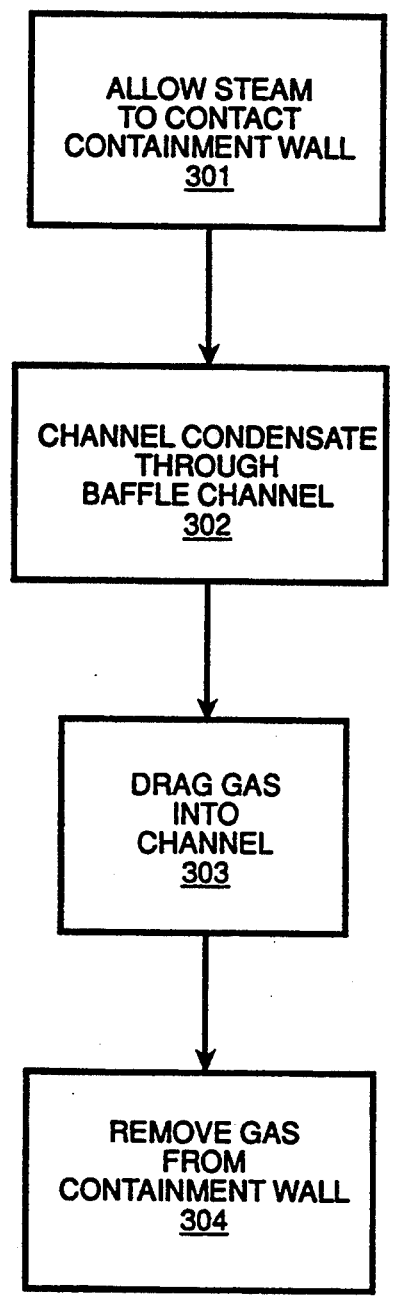
FIG. 3 is a flow chart of a method of the present invention practiced in the reactor plant of FIG. 1.

A method 300 of the present invention is shown in FIG. 3. In a first step 301 of method 300, steam is allowed to rise to contact wall 138 of containment dome 132. Condensate from the steam is then channeled, at step 302, generally downward through channel 140. At step 303, gases, including noncondensables, are dragged by condensate into channel 140. The noncondensable gases are removed, at step 304, from containment wall 138 by the dragging action of the condensate.

Figure 4:
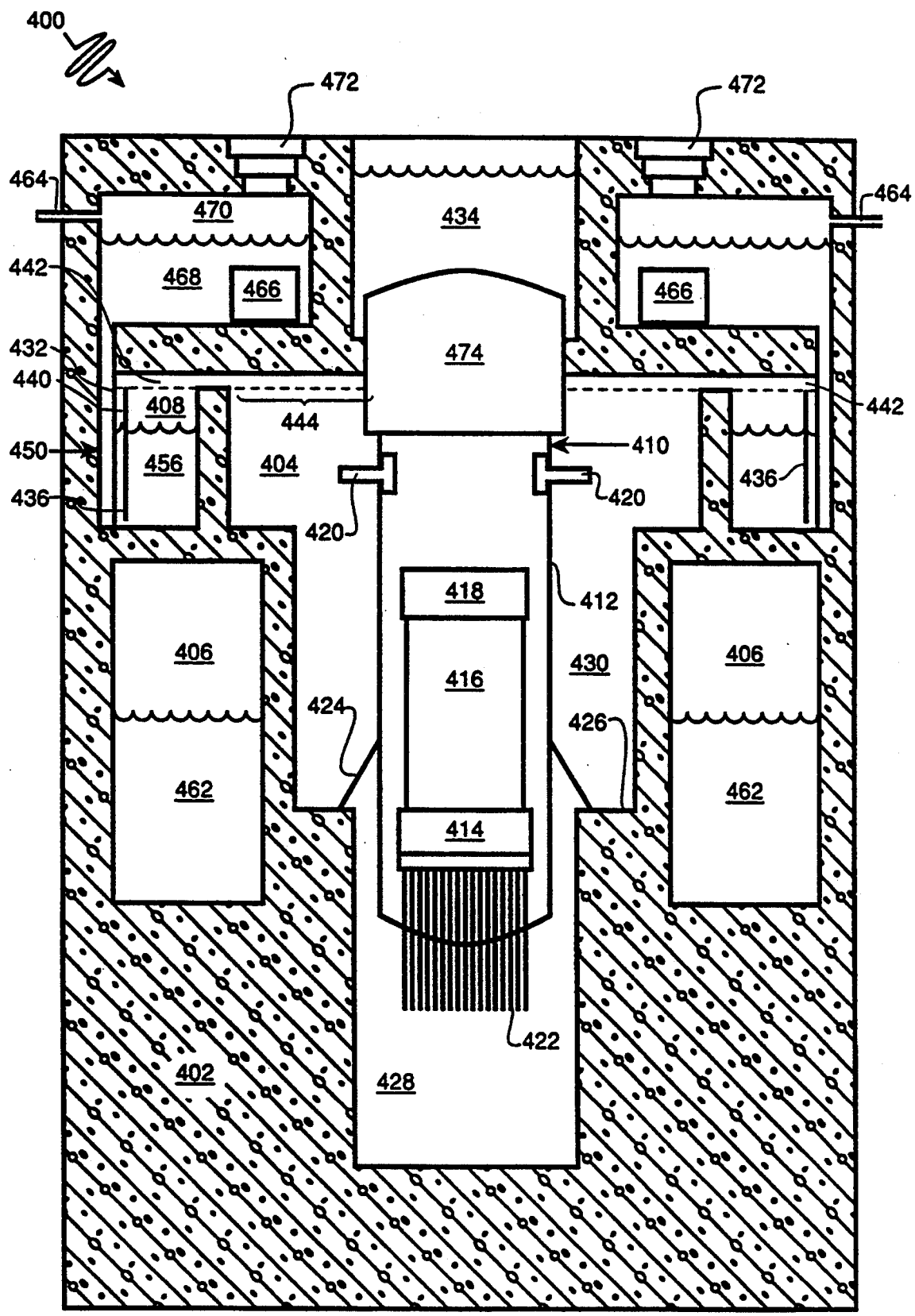
FIG. 4 is a schematic sectional view of another reactor plant in accordance with the present invention.

An alternative reactor plant 400 embodying the present invention is shown in FIG. 4. Where it facilitates comparison, like parts share the last two digits of their reference numerals with those of their counterparts in FIG. 1. Building 402 includes several compartments, including a drywell 404, a wetwell 406 containing a suppression pool 462, and a GDCS chamber 408. A reactor 410, disposed within drywell 404, comprises a reactor pressure vessel 412 and its internals including a fissionable core 414, a chimney 416, a dryer 418, main steam nozzles 420, and control rod assemblies 422. Vessel 412 is supported by a skirt 424 on a ledge 426 of drywell 404. Skirt 424 divides drywell 404 into a lower drywell 428 and an upper drywell 430.

Reactor plant 400 differs from reactor plant 100 in having isolation condensers 466 submerged in an isolation condenser pool 468 contained in an isolation condenser chamber 470. Isolation condenser pool 468 is vented to the environment through vents 464, so that isolation condensers 466 serve as part of the containment boundary. Hatches 472 are arranged over isolation condensers 466 to provide access for isolation condenser repair and inspection.

Reactor plant 400 also includes a reactor hood 474 which serves as part of the containment boundary and performs functions not directly pertinent to this invention. However, it is covered by a shielding pool 434 that will condense some of the steam. A GDCS system 450 includes annular GDCS chamber 408. A cylindrical steel outer wall 432 serves as part of the containment boundary. A baffle 436 parallels wall 432 at a distance of 25 mm to define a vertical condenser channel 440 with an annular cross section.

During an isolation incident, some of the steam rises through an annular access aperture 444 to an upper volume 442 above baffle 436. Steam contacting steel GDCS wall 432 condenses, and steam condensing over channel 440 falls down channel 440, drawing uncondensed steam and noncondensable gases into GDCS chamber 408. In this case, baffle 436 and steel wall 432 serve to keep noncondensables from stagnating at steel wall 432 where they could interfere with heat transfer.

In the described embodiments, baffles are used to promote heat transfer through a water wall of a drywell and of a GDCS chamber. Alternatively, baffles can be used to promote heat transfer at a water wall boundary of a wetwell. Also, the baffle can promote heat transfer through a larger surface area dry containment wall. These and other modifications to and variations upon the described embodiments are provided by the present invention, the scope of which is limited only by the following claims.

I claim:
1. A reactor plant comprising:
a reactor including a reactor pressure vessel and its internals;
a containment having an interior in which said reactor is located, said containment isolating said reactor from an exterior environment, said containment comprising a thermally conductive wall;
a heat sink located in said exterior environment and in contact with said thermally conductive wall, said thermally conductive wall forming an interface between said containment interior and said heat sink;
baffle means arranged inside said containment interior and spaced from said thermally conductive wall to form a channel therebetween, the top of said baffle means being disposed below a predetermined upper volume of said containment interior, said top of said baffle means and an opposing portion of said thermally conductive wall forming an inlet through which fluids in said predetermined upper volume can enter said channel, said baffle means being configured to confine said fluids to a generally downward flow path away from said predetermined upper volume.

2. A reactor plant as recited in claim 1 wherein at least a portion of said wall is dome-shaped.

3. A reactor plant as recited in claim 1 wherein at least a portion of said wall is cylindrical.

4. A reactor plant as recited in claim 1 wherein said wall is made of steel.

5. A reactor plant as recited in claim 1 wherein said baffle is separated from said thermally conductive wall by a distance equal to between 5 and 150 mm.

6. A reactor plant as recited in claim 1 wherein said baffle is separated from said thermally conductive wall by a distance selected so that condensate drags gaseous matter through said channel.

7. A reactor plant as recited in claim 6 wherein said distance is selected so that said condensate drags gaseous matter through said channel at a velocity sufficient to induce turbulent flow of said gaseous matter.

8. A method of relieving pressure buildup in the interior of a reactor containment for a boiling-water reactor, comprising the steps of:
allowing steam to rise to contact a thermally conductive wall of said containment;
dissipating heat from said wall to a heat sink external to said containment and in contact with said wall;
channeling at least some of the condensate from said steam so that it flows generally downward through a channel bounded in part by said wall and in part by a baffle spaced at most 150 mm from said wall; and dragging gaseous matter into said channel along with said condensate;

whereby gaseous matter is continually removed from said thermally conductive wall.

9. A method as recited in claim 8 wherein said gaseous matter is dragged at a sufficient velocity to induce turbulent flow.

10. A method as recited in claim 8 wherein said baffle is separated from said thermally conductive wall by a distance equal to between 5 and 150 mm.

11. A reactor plant as recited in claim 1 wherein said heat sink is a pool of water, further comprising means for venting steam from said heat sink to said exterior environment.

12. A reactor plant as recited in claim 1 wherein said baffle means is an open-topped dome and said thermally conductive wall is a closed-topped dome, said heat sink being in contact with the top of said close-topped dome.

13. A reactor plant as recited in claim 1 wherein said baffle means and said thermally conductive wall are cylindrical walls arranged to be mutually concentric, said thermally conductive wall having a height greater than the height of said baffle means.

14. A reactor plant as recited in claim 1 wherein said fluid includes steam which condenses on said thermally conductive wall, said condensate being pulled downward by gravity.

15. A reactor plant as recited in claim 14, wherein a plurality of fins are located between said wall and said baffle means, said fins being selectively inclined to provide a path for said condensate of steam to flow from said wall to said baffle means.

* * * * *